United States Patent [19]

Raycher et al.

[11] Patent Number: 4,660,343
[45] Date of Patent: Apr. 28, 1987

[54] STUD WELDABLE REFRACTORY ANCHOR

[75] Inventors: Robert J. Raycher; Charles C. Pease, both of Vincentown, N.J.; Kevin L. Bernd, Porrance, Calif.

[73] Assignee: KSM Fastening Systems Inc., Moorestown, N.J.

[21] Appl. No.: 772,303

[22] Filed: Sep. 4, 1985

[51] Int. Cl.⁴ .......................... E04B 1/24; E04C 2/04
[52] U.S. Cl. ...................................... 52/378; 52/334; 52/443
[58] Field of Search ............ 52/443, 334, 378; 411/965; 219/99, 98; 110/246; 138/176

[56] References Cited

U.S. PATENT DOCUMENTS

| | | | |
|---|---|---|---|
| 3,076,481 | 2/1963 | Wygant | 52/318 |
| 3,336,712 | 8/1967 | Bartley | 52/378 |
| 4,479,337 | 10/1984 | Crowley | 52/443 |

OTHER PUBLICATIONS

*Stud Welding Ferrous and Nonferrous Metals*, by Nelson Stud Welding, Lorain, Ohio, 1955, p. D 17.

*Primary Examiner*—John E. Murtagh
*Attorney, Agent, or Firm*—Charles F. Duffield

[57] ABSTRACT

The present disclosure is for improvements to metallic refractory anchors heretofore in use which are of a general S type configuration and which are welded to metallic walls of vessels to secure in place refractory insulation of a high abrasion resistance. The improvements consist of reforming the weld end of the S anchor in a manner to reduce the length to width ratio of the weld end to approximately no greater than 6 to 1 to permit stud welding of the anchor by the stud end welding technique. Additional metallic members are resistance welded to the weld end of the anchor to decrease the length to width ratio to within the range capable of stud welding. The additional metallic members may be formed of separate members or by extended legs of the metal anchor folded back onto a weld projection and resistance welded in place.

4 Claims, 8 Drawing Figures

STUD WELDABLE REFRACTORY ANCHOR

BACKGROUND OF INVENTION

The present invention is concerned with the field of anchoring of refractory linings to the metallic walls of vessels, conduits and the like.

In many industries such as refineries and chemical processing plants, tanks, conduits and the like are exposed to gases and liquids which are at extremely elevated temperatures and which carry highly erosive particles. These conduits and vessels are lined with refractory material commonly known as refractory concrete which provides both temperature and erosion protection.

One of the major problems encountered in securing the refractory concrete to the vessels and conduits is to provide an anchoring system which will provide the necessary pull strength to prevent the refractory lining from separating from the wall of the vessel or conduit being lined. Additionally, it is a desirable feature of such an anchoring system that the anchoring system itself prevent protection against channeling or erosion of the refractory lining by means of the fluids passing through or upon the surface of the refractory.

One form of refractory anchoring system that has been in use over the years is the hexagonal steel grid. This is a sort of honeycombed appearing steel grid which is welded by hand or otherwise secured to the walls of the vessels or conduits to be lined. The problems with this form of anchor lining system has resulted in entire sections pulling loose which are known as sheet failure or specific areas buckling or pulling away from beneath in what is known as blister failure.

Dr. Michael S. Crowley, working in conjunction with Standard Oil Company of Indiana, designed and developed a refractory anchor system formed of separate and discrete anchors which are hand welded to the wall of the vessel or conduit to be lined with the refractory. These anchors are formed of an S configuration in the upper region thereof and extend down to a weld end. A plurality of these anchors are secured along the metallic wall of the vessel to be lined in random configurations. The extending arms of the S configured anchor provide anchorage for the concrete lining underneath the arms. In a like manner, the S configuration of the arms likewise provide anchoring of the material and also provide deflection and erosion resistance to the refractory material secured by the anchors.

The S configured refractory anchor is the subject matter of U.S. patent application Ser. No. 140,174, filed Apr. 14, 1980. This United States patent application was filed as a European patent application No. 81301620.1 on Apr. 13, 1981. This European patent application has been published as European patent application Publication No. 0038204 on Oct. 21, 1981.

The foregoing European patent application and its counterpart U.S. patent application set forth in detail the background associated with these S configured anchors, the problems experienced in the field, the advantages of the S configured anchor and its solution of these problems and further describe in detail the structure of the S configured anchors.

The subject matter of the present patent application consists of improvements to the Crowley S configured anchor. For this reason, the applicant hereby makes reference to the foregoing Crowley U.S. and European patent applications and incorporates the disclosure thereof into this application by reference thereto. For the convenience of the examiner, a copy of the Crowley European patent application is being filed herewith as Appendix A to this patent application.

The Crowley type S configured anchor is generally formed of 16 gauge material. The weld end is approximately 2 inches in length. The anchors are conventionally welded by hand stick welding on either one or both sides of the weld end of the anchor.

Where the anchors are welded both sides of the anchor, the normal hourly production or welding rate is 12 anchors per hour or approximately 96 anchors per shift. The anchors thus welded demonstrate an approximate pull strength of 7,000 lbs per anchor.

One of the major disadvantages of the Crowley design of refractory anchor is the excessive time that it takes to weld or secure each anchor to the surface to be protected.

The material utilized in the Crowley anchor is 16 gauge stainless steel either 304, 310 or 3/16. This thickness of material, which is approximately 1/16 of an inch and presenting a weld end of approximately 2 inches long, presents a length to width welding surface of approximately 32 to 1.

There has been a desire to utilize the quick and time efficient and inexpensive stud end welding technique for securing the Crowley type anchors. However, for materials of this nature generally, a length to width ratio in excess of 6 to 1 is not acceptable for the stud end welding technique.

It is not practical to reduce the length of the weld end of the Crowley stud while maintaining the same thickness of material to bring the weld surface into the proper ratio inasmuch as this would then reduce the total weld area to a point far below the necessary pull strength required for the anchor. In a like manner, it would not be practical to increase the thickness of the material utilized to fabricate the Crowley type of anchor due to the prohibited increased costs for the anchors due to the increased material.

Accordingly, the problem to be resolved with the Crowley type of refractory anchors is to continue to utilize a material of approximately 16 gauge while, at the same time, fabricating the anchors in their weld end of a type and nature of configuration suitable for welding by the stud end welding technique and retaining the requisite pull strength following the weld.

SUMMARY OF INVENTION

The present invention provides improvements to the Crowley S configured refractory anchor by presenting a weld end configuration of the type which is capable of being welded by the stud end welding technique.

In accordance with the present invention, the lower portion of the Crowley S configured anchor utilizes an additional cutout portion which will shorten the overall weld length of the welding projection or weld end of the anchor. One or more additional metallic members of a width approximately that of the weld end is positioned upon the weld projection and resistance welded in place to the intermediate portion of the refractory anchor which extends into the shortened weld end thereof. The resultant configuration is one of a length to thickness ratio which is within the range to be welded by the stud end welding technique while at the same time presenting the requisite cross-sectional area of welding for the desired weld strength.

In a further embodiment, the additional metallic members are formed of the same sheet material as the remainder of the anchor and formed to provide extended legs. The extended legs at either end of the intermediate portion are integral therewith and are folded over into mating relationship with the weld end of the anchor projecting from the intermediate portion thereof to provide the requisite length to width ratio. These extended legs may also be resistance welded to the intermediate portion of the anchor to provide further pull strength of the resultant anchor once stud welded in place.

DESCRIPTION OF DRAWINGS

FIG. 3 is a partial perspective view of the embodiment of anchor of FIGS. 2 and 3 with a further modification of additional stabilizing legs;

DETAILED DESCRIPTION OF INVENTION

Figure 1:
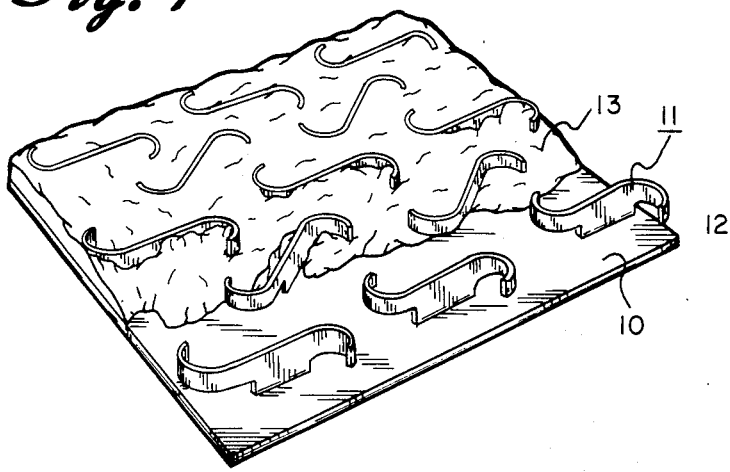
FIG. 1 is a perspective view partially in section showing the Crowley S configured type of anchors welded in place and securing the refractory concrete as in a typical installation.

FIG. 1 of the drawings illustrates a typical installation of the prior art Crowley S configured insulation hanger to the metallic surface 10 of a vessel or conduit to be lined with a refractory concrete material. The S configured metallic anchors 11 are welded at their weld end 12 by means of a conventional hand or stick welding operation. After a plurality of such anchors are welded in place in random alignment, a monolithic refractory concrete lining 13 is positioned upon the anchors. The manner of securement of the refractory concrete in conjunction with the extending arms of the anchors and the function and operation of the anchors to resist erosion is more fully discussed and described in the Crowley patent applications referenced in the background of invention. It is not believed necessary to further expand on that aspect of the Crowley S configured anchor.

Figure 2:
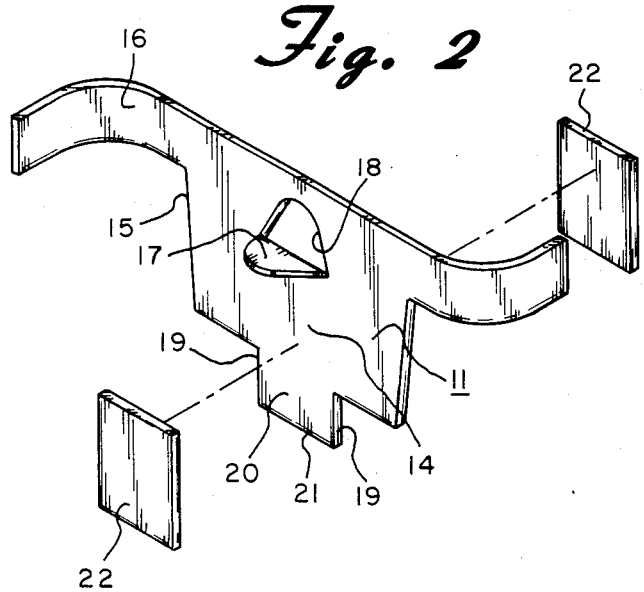
FIG. 2 is a perspective exploded view of a first embodiment of the refractory anchor of the present invention.
Figure 3:
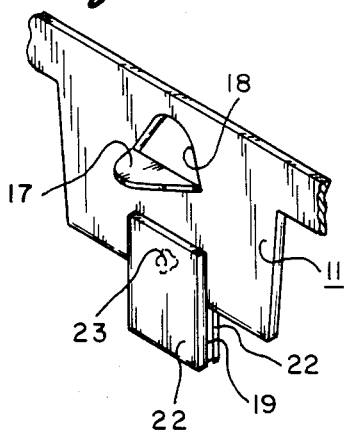
FIG. 3 is a partial perspective view of the embodiment of FIG. 2 in assembled position.

The metallic refractory anchor of the present invention, and as may be seen in FIGS. 2-3 of the drawings, retains essentially the same upper configuration as that of the Crowley S configured anchor. That is to say, 11 is stamped or formed from a relatively thin sheet of metallic material such as 304 stainless of approximately 16 gauge. The anchor, upon fabrication, includes an intermediate portion 14. Extending from the intermediate portion and formed by cut away portions 15 therefrom are extending arms 16. These arms 16 may be curved in opposite directions to form an S configuration.

Located centrally within the intermediate portion 14 of the metal anchor 11 is a tab 17 punched from the intermediate portion. The tab 17, following its formation, provides a hole 18 in the intermediate portion. This tab 17 and hole 18 provide a gauge for gauging the thickness of refractory material being applied to the metallic surface 10 and also provide an indicator for the degree of erosion which has occurred after the system is in operation all as more fully described in the Crowley patent applications.

In accordance with the present invention, additional cutouts 19 from the intermediate portion 14 provide an extending weld projection 20 terminating in a weld end 21.

During the fabrication operation, the material which is scrapped in providing the cut away portions 15 and/or the additional cutouts 19 is utilized to provide a plurality of additional metallic members 22. These additional metallic members are of a width approximately the width of the weld end 21 of the weld projection 20. The height of the additional metallic members 22 is in excess of the height of the weld projection 20 and extends into the intermediate portion 14 of the metallic anchor 11.

As may be seen in FIG. 3, an additional metallic member 22 is placed on either side of the weld projection 20. The additional metallic members 22 are secured by means of a resistance weld 23.

In a typical application, the thickness of the material of the metallic anchor in accordance with the present invention is 16 gauge or 1/16 of an inch in thickness. The length of the weld end 21 and the additional metallic members 22 is approximately ¾ of an inch. The weld projection 20 and the two metallic members 22 therefor present a weld surface area of 3/16 of an inch by ¾ of an inch. This presents a weld area of a length to width ratio of approximately 4 to 1.

The weld end 21 of the assembled anchor may be slightly curved or chamfered to aid in welding. Additionally, a flexing material such as aluminum may be used on the weld end of the assembled anchor.

The resistance weld 23 may be one, two or more such welds for each additional metallic member as desired. The controlling factor is that the size of the resistance weld and/or number thereof should prevent sufficient weld area following welding as to have a combined shear strength in excess of the desired pull strength for the anchor as a whole. It has been found that a resistance weld of approximately 3/16 of an inch in diameter for each additional metallic member is sufficient.

The improved S configured anchor of the present invention can be welded by the conventional stud end welding technique. A current of approximately 800 to 900 amps is utilized with a voltage of approximately 75 to 80 volts. A rectangular arc shield is also preferably used.

An S configured anchor in accordance with the present invention, when welded in place, will present a pull strength of somewhere within the range of 5,500 to 6,000 lbs. Welding of S configured anchors in accordance with the present invention can be achieved by ordinary labor rather than the more expensive certified welders. Welding of the S configured anchors by the stud end welding technique can be accomplished at the rate of approximately 6 per minute or 360 per hour which is approximately 30 times greater than that which can be achieved by hand welding the standard S configured anchor.

The S configured anchors, in accordance with the present invention, generally will maintain the same general length and width of the weld end. However, the anchors can be configured in S lengths of approximately 5½ inches and varying heights from 1 to 5 inches as desired.

Figure 4:
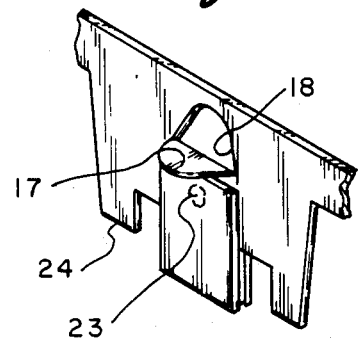

A further modification to the design of S configured metallic anchor in accordance with the present invention is shown in FIG. 4 of the drawings. In this modified embodiment, a stabilizing leg 24 is formed on each side of the weld projection. The stabilizing leg is approximately 3/16 inches shorter than the weld projection 20. During welding, the intensity of the heat resulting in melting of the metallic surface 10 and the weld end 21 of the anchor will provide for burnoff or reduction in length of approximately 3/16 inches. As this occurs, the stabilizing legs 24 will come into contact with the metallic surface and thus provide additional rigidity of the anchor upon the metallic surface following welding.

Figure 5:
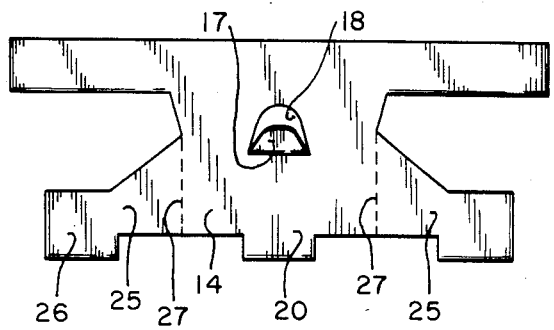
FIG. 5 is an elevational view of a second embodiment of refractory anchor of the present invention utilizing extended legs prior to assembly.
Figure 6:
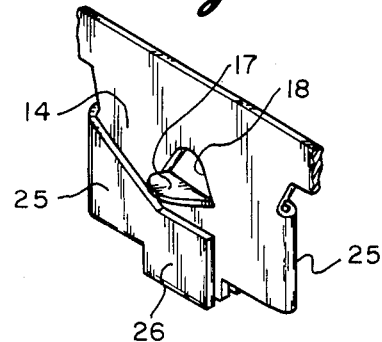
FIG. 6 is a partial perspective view of the refractory anchor of FIG. 5 wherein the extended legs have been folded into position.

A second embodiment of the metallic refractory anchor of the present invention is shown in FIGS. 5 and 6 of the drawings. In this second embodiment, during fabrication of the anchor, an extended leg 25 is formed on either side of the intermediate portion 14.

Each extended leg 25 terminates in an additional metallic member 26 of length and width substantially that of the additional metallic members 22 of the embodiment of FIGS. 2 and 3 and also approximates the weld projection 20. The extended legs are of a length such that they can be folded along lines 27 and, as best shown in FIG. 6, when so folded to align with the weld projection 20 in a manner to present a combined weld surface of the weld projection 20 and additional metallic members 26 as in the case of the embodiment of FIGS. 2 and 3. If desired, the additional metallic members 26 may be resistance welded to the intermediate portion 14 of the refractory anchor as in the case of the embodiment of FIGS. 2 and 3.

Figure 7:
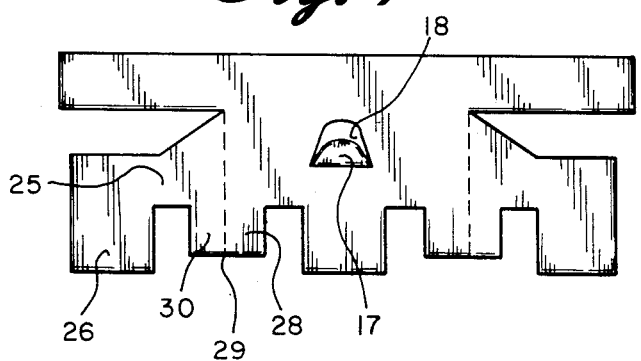
FIG. 7 is an elevational view of the refractory anchor of FIGS. 5 and 6 prior to assembly and showing the inclusion of further extended legs.
Figure 8:
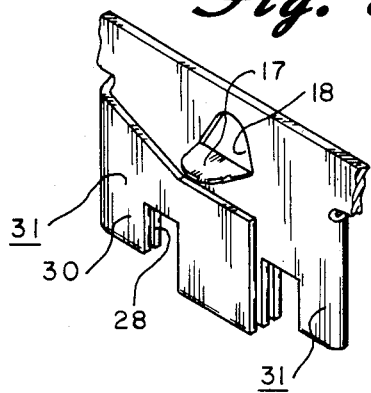
FIG. 8 is a partial perspective view of the refractory anchor of FIG. 7 in assembled position.

The second embodiment shown in FIGS. 5 and 6 of the drawings may be further modified to provide a stabilizing leg on either side of the weld projection 20 of the refractory anchor as shown in FIGS. 7 and 8 of the drawings. An inner stabilizing leg 28 is formed from the intermediate portion 14. This inner stabilizing leg extends over a fold line 29 to form a further stabilizing leg 30. When the extended leg 25 and its additional member 26 is folded along fold line 29, as shown in FIG. 8, there will be presented on either side of the combined weld end a further stabilizing leg 31 formed of the stabilizing legs 28 and 30. The length of the combined stabilizing leg 31 is essentially the same as that of the embodiment of FIG. 4 such that, following welding, the stabilizing legs will just engage the metallic surface to be lined to provide a further stabilizing effect upon the refractory anchor.

The present invention has been described in respect to particular embodiments thereof shown in the drawings. Other variations and modifications of the invention will thus be apparent to those skilled in the art and accordingly, no limitation as to the scope of the invention was intended by reference to the specific embodiments shown in the drawings but the scope of the invention is to be interpreted in accordance with the appended claims.

What is claimed is:

1. In a metal anchor adapted for installation by welding to a metal surface to provide anchorage for a monolithic refractory applied to the surface, wherein the anchor is formed from a thin metal strip having its width substantially equal to the thickness of the refractory to be applied to the surface and its length at least equal to its width and having cut away portions at each end on the side to be welded to the surface forming an intermediate portion terminating in a weld end and arms extending from the intermediate portion opposite the weld end of the intermediate portion providing an erosion resistant barrier for the protection of the refractory and the cut away portions adjacent the arms providing room for the refractory to be deposited between the arms and the surface, the improvements permitting welding of the weld end of the intermediate portion by the stud end welding technique comprising:

at least one additional cutout adjacent the weld end of the intermediate portion to provide a weld projection of reduced length and wherein there is further provided at least one additional metallic member secured to the intermediate member of length approximately that of the weld projection to provide a length to width ratio at the weld end of 6 to 1 or less.

2. The metallic anchor of claim 1 wherein the additional metallic member is welded to the intermediate portion of the metallic anchor.

3. The metal anchor of either claim 1 or claim 2 wherein the additional metallic member is formed as an extended leg from the thin metal strip and is folded back into alignment with the weld projection.

4. The metal anchor of claim 1 further including at least one stabilizing leg projecting from the intermediate portion of the metal anchor a distance slightly less than the height of the weld projection to provide stabilization for the anchor once welded in place.

* * * * *